3,257,415
CONVERSION PROCESS

Thomas M. O'Grady, Chicago Heights, Ill., and Robert M. Alm, Crown Point, and Melvern C. Hoff, Highland, Ind., assignors to Standard Oil Company, Chicago, Ill., a corporation of Indiana
No Drawing. Filed May 25, 1962, Ser. No. 197,599
5 Claims. (Cl. 260—340.5)

This application is a continuation-in-part of application Serial No. 105,875, filed April 27, 1961, now abandoned.

This invention relates to a process for isomerizing unsaturated organic compounds and more particularly pertains to a method of shifting non-aromatic unsaturation in organic compounds by contacting the organic compound with a novel catalyst.

The shifting of double bonds in olefinic hydrocarbons such as mono-olefinic hydrocarbons as well as dienes and other unsaturated olefins having a plurality of double bonds is useful in the synthesis of various specific hydrocarbons, for example in the conversion of 1-olefins to 2-olefins and the conversion of hydrocarbon drying oils having a plurality of non-conjugated carbon-to-carbon unsaturation in the chain to superior drying oils having a high degree of carbon-to-carbon conjugated unsaturation. The shifting of double bonds in unsaturated ethers, e.g., converting safrole to isosafrole and converting diallylether to dipropenyl ether is also of use. Isosafrole is useful in the preparation of heliotropin as starting material for synthesizing perfumes. Dipropenyl ether may be used as a monomer for the preparation of polymeric materials containing ether linkages. The shifting of double bonds in unsaturated nitriles, e.g., the conversion of 3-butenenitrile to 2-butenenitrile containing conjugated unsaturation, is useful in the preparation of polymerizable monomers as well as in the preparation of intermediates for manufacturing pharmaceuticals.

We have now discovered a process for isomerizing unsaturated organic compounds by shifting carbon-to-carbon double bond unsaturation in a carbon chain without substantially affecting skeletal isomerization, dehydrogenation, disproportionation and polymerization. In fact, the foregoing side reactions, if they are at all perceptible, are markedly minimized. The process of this invention comprises contacting an organic compound containing at least one carbon-to-carbon double unsaturation in an inert atmosphere with a catalyst comprising in the range of about 1 to 25 weight percent metallic sodium and in the range of about 0.1 to 10 weight percent of a compound of a transition metal supported on activated alumina, e.g., eta- or gamma-types of alumina. Thereafter, the resulting double bond shifted product is recovered.

In our abandoned application Serial No. 105,875, filed April 27, 1961, there was disclosed and claimed the conjugation of double bonds in hydrocarbons containing a plurality of non-conjugated double bonds and having no quaternary carbon atoms situated between the double bonds and wherein at least one of the double bonds is outside of an aromatic ring by contacting said hydrocarbon with a catalyst comprising sodium and transition metal supported on activated alumina supported catalyst. Work in progress at that time led to a broader application of said catalyst to the shifting of double bonds in a great variety of organic compounds containing at least one carbon-to-carbon double outside an aromatic ring. The catalyst comprising 1 to 25 weight percent metallic sodium and 0.1 to 10 weight percent of a compound of a transition metal supported on activated alumina can affect the non-aromatic double bond shift in mono-olefinic hydrocarbons, ethers and thioethers whose hydrocarbon groups contain monoolefinic hydrocarbon groups and polyunsaturated hydrocarbon groups, nitriles containing carbon-to-carbon unsaturation, and tertiary amines whose substituents on the nitrogen are hydrocarbon and contain 1, 2, 3 or more carbon-to-carbon double bonds. In the case of mono-olefinic ethers the carbon-to-carbon double bond is shifted to the positions alpha and beta with respect to the ether oxygen or sulfur. A plurality of double bonds present become conjugated. In the tertiary amines one double bond shifts to the alpha-beta position with respect to the nitrogen atom and the presence of two double bonds will form a conjugated system. The above catalyst can be used at sufficiently low temperatures to prevent not only polymerization but also decomposition of the starting material by removal of oxygen, sulfur or nitrogen in the foregoing feeds.

Also discovered, in addition to the benefits with respect to double bond shifting, is that the sodium-transition metal supported on activated alumina can be promoted with an alkaline earth oxide, e.g., calcium oxide, magnesium oxide, barium oxide and the like. The use of alkaline earth oxide promoters results in the formation of a catalyst of higher initial activity. For example, without the alkaline earth oxide the catalyst produces substantially 90% conversion of pentene-1 to pentene-2 at $-78°$ C. in about 30 minutes whereas with alkaline earth oxide promoter the ultimate conversion at $-78°$ C. is not only substantially 100% but this higher conversion is obtained substantially as soon as the feed contacts the catalyst, e.g., 2 to 5 minutes after initial contact. Also, the use of alkali metal carbonates especially sodium carbonates function as a promoter by increasing the conversion from the aforementioned 90% ultimate in 30 minutes of pentene-1 to pentene-2 to substantially 100% conversion in about 10 minutes after initial contact with the catalyst. For purposes of comparison, at $-78°$ C. pentene-1 is converted to pentene-2 at an ultimate maximum of only about 5% by the same percent of metallic sodium or gamma-type alumina (no transition metal or promoters) and this ultimate 5% conversion is reached only after about 60 minutes from initial contact of pentene-1 with this supported metallic sodium catalyst.

Even unsaturation in the carbon chain of aldehydes may be shifted by the process of this invention through the use of the acetal derivatives of the aldehydes.

From the foregoing it will be readily apparent that feeds suitable in the process of this invention contain with the exception of the oxygen or sulfur of the ethers, oxygen in acetals and the nitrogen of the nitriles and tertiary amines only carbon and hydrogen atoms. Feeds which contain only hydrogen and carbons (hydrocarbon feeds) are those 1-olefin hydrocarbons and hydrocarbons having a plurality of double bonds, at least one of such double bonds being outside of an aromatic ring. Examples of suitable feed hydrocarbons containing a plurality of double bonds are the dienes, the trienes, and other noncyclic olefins having a plurality of double bonds; naphthenes substituted with one or more radicals having a total of at least two double bonds; the so-called "unsaturated" naphthenes (a cyclic having one double bond within the ring) substituted with at least one olefinic radical; cyclic dienes and trienes, which may be optionally substituted with olefinic radicals, and aromatics, including naphthalenes, substituted with at least one olefinic radical.

Specific illustrative examples of dienes suitable for conjugation by our process are pentadiene-1,4; pentadiene-1,2 (a cumulated double bond compound); hexadiene-1,2; hexadiene-1,4; hexadiene-1,5 (sometimes called diallyl); octadiene-1,4 (conylene); 2,5-dimethyl hexadiene-1,5; 4-methyl octadiene-1,5; decadiene-3,7; 2,6-dimethyl octadiene-2,7 (dihydromyrcene); undecadiene- 1,9; and tetratriocontadiene-9,25. Illustrative suitable triolefins are heptatriene-1,3,6; 3-methylene, 7-methyl octadiene-1,6 (myrcene); 2,6-dimethyl undecatriene-1,5, 8; and tridecatriene-1,2,12.

Illustrative cyclic dienes are cyclohexadiene-1,2; cyclohexadiene-1,4; cyclooctadiene-1,5; 1,4-dimethyl cyclohexadiene-1,4; 1-methyl-4 isopropyl cyclohexadiene-1,3 (gammaterpinene); an illustrative cyclotriene is cyclooctatriene-1,3,6.

Illustrative naphthenes substituted with olefinic radicals comprising at least two double bonds are 1,3-diethylene cyclopentane; hexadiene-1,5 cyclopentane; 1-propene, 4-ethylene cyclohexane; 1,3 methylene cyclohexane; and pentadiene cyclononane.

Illustrative examples of suitable dienes comprising an unsaturated ring having at least one double bond (the so-called "unsaturated" naphthenes) and substituted with at least one olefinic radical are 4-butenyl cyclohexene; and 1-methyl, 4-isopropenyl cyclohexene-1 (dipentene).

Illustrative hydrocarbons comprising an aromatic ring and at least one double bond outside of the ring are 3-phenyl propene-1 (allyl benzene); 4-phenyl butene-1; and 1-phenyl hexadiene-1,4. An illustrative dicyclic aromatic substituted with at least one olefinic radical is 4-naphthalenyl butene-1.

In addition to the illustrative compounds enumerated above, other suitable feeds comprise natural and synthetic drying oils, and olefinic polymers of low or intermediate molecular weight, in the range of about 500 to 5,000. A specific illustration of an olefinic polymer which is a suitable feed is a butadiene polymer having a molecular weight of about 1,000 to 2,000.

Suitable 1-olefin hydrocarbon feeds contain more than three carbon atoms as for example 1-butene, the 1-pentenes, the 1-hexenes, the 1-heptenes, 4,6-dimethyl 1-heptene, 2,3,6-dimethyl 1-heptene, 2,4,4-trimethyl 1-heptene, 3,5,5-trimethyl 1-heptene, 1-octenes, 1-nonenes, 1-decenes, 1-dodecenes, 1-hexadecenes, 1-octadecenes and the like. Mixtures of 1-olefins as well as 1-olefins in admixture with paraffins, naphthenes and aromatic hydrocarbons can be used as feeds. There is no apparent upper limit on the number of carbon atoms in suitable 1-olefin hydrocarbon feeds for the process of this invention.

Suitable unsaturated nitrile feeds for the process of this invention include 3-butenenitrile, 4-pentenenitrile, 3-pentenenitrile, 3-heptenenitrile, 4-heptenenitrile, 5-heptenenitrile, 6-heptenenitrile, 3-hexenenitrile, 4-hexenenitrile, 5-hexenenitrile, oleonitrile (9-octadecenenitrile), 3 - octadecenenitrile, 6-dodecynedinitrile, 3,7-decadienedinitrile, and the like. An advantage of the process of this invention is obtained by its ability to convert an isomeric mixture of alkene nitriles, e.g. heptene nitriles, to a single 2-alkenenitrile, e.g. 2-heptenenitrile, without causing polymerization or skeletal isomerization of the alkenenitrile.

Suitable ether and thioether feeds for the process of this invention include diallyl ether, diallyl sulfide, allyl methyl ether and thioether, allyl ethyl ether and thioether, allyl propyl ether and thioether, allyl isopropyl ether, allyl butyl ether, allyl amyl ether, allyl 2-butenyl ether, methyl 2-octenyl ether, 2-methallyl propyl ether, 3-hexenyl ethyl ether, 3-hexenyl ether, 3-butenyl ethyl ether, ethyl 4-methyl-3-pentenyl ether, 6-heptenyl methyl ether, 1,5-dimethyl-4-hexenyl methyl ether, ethyl 1-ethyl-allyl ether, 2-allylfuran, 3-allyl tetrahydrofuran, 2-pentenylfuran, allyl pyrans, allyl thiofurans, and the like.

Suitable unsaturated tertiary amines for feeds in the process of this invention include the

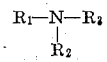

amines wherein the R groups are chain hydrocarbons containing 3 or more carbon atoms; e.g., 3 to 20 carbon atoms, and wherein $R_1$, or $R_1$ and $R_2$ or all three R groups contain one or more carbon-to-carbon unsaturation in the hydrocarbon groups. Specific tertiary amines containing alkenyl hydrocarbon groups include triallylamine, N-butyldiallylamine, N-2-propenyl diallylamine, methyl diallylamine, N,N-dimethyl decenylamine, N,N-dibutyl-3,3-diphenyl allylamine, N,N-diethyl allyl amine, N,N-diethyl hexenylamine, N,N-dimethyl-3-dodecenyl amine, N,N-diethyl 4-(5- or 6-) heptenylamine, N,N-diethyl 5-hexen-2-ynylamine, and the like. By shifting the carbon-to-carbon unsaturation to positions alpha-beta to the nitrogens, feeds for cyclization can be prepared. For example N-butyl diallylamine may be converted to N-butyl di-(1-propenyl)amine.

As herein before mentioned the unsaturation in the carbon chain of an aldehyde may be also shifted inwardly in the chain by employing acetals of the aldehyde dimethyl, diethyl, etc. acetals of 6-decenal, 4-heptenal, hexadecenals, hexadienals, buten-3-al, 2,4-pentadienal, 3-octen-5-ynedial, and the like may be converted to acetals wherein the double is alpha-beta with respect to oxygens; e.g. the acetal of buten-3-al is converted to acetal of crotonaldehyde.

It is to be understood that mixtures of compounds containing carbon-to-carbon unsaturation may be used as the charge to the process. With respect to feeds containing a plurality of carbon-to-carbon unsaturation, it will be further understood that conjugation of double bonds is unlikely to occur in a molecule where there is a quaternary carbon atom situated between the double bond in the carbon chain, inasmuch as a quaternary carbon atom hinders the migration of the double bond and thus prevents conjugation from occurring.

The feed for the process does not have to be of any particular purity and may contain a diluent, such as paraffinic or aromatic hydrocarbons. The presence in the feed of ketones or aldehydes is somewhat undesirable because of condensation reactions which may occur and which in the course of time tend to deactivate the catalyst. The presence in the feed of carboxylic acids or alkyl halides also is undesirable because of the reaction of such compounds with the sodium of the catalyst thereby reducing the amount of available effective catalyst. Because water, inorganic halides and peroxides also reduce the amount of available effective catalyst, we prefer to contact the feed with an adsorbent-desiccant, such as silica gel or activated alumina, prior to contacting with the sodium-transition metal-on alumina catalyst.

The catalyst comprises in the range of about 1 to 25 weight percent metallic sodium, and in the range of about 0.1 to 10 weight percent of a compound of a transition metal supported on gamma-type alumina.

The gamma-type aluminas are designated by A. S. Russell et al. in "Alumina Properties," published as Technical Paper No. 10 by the Aluminum Company of America, as chi-, gamma-, eta-, delta-, kappa-, and theta-alumina. The gamma-type aluminas are characterized by being substantially anhydrous and having high surface areas, on the order of 150–400 square meters per gram. They are obtained by calcining alpha- or beta-alumina trihydrates, or alpha-alumina monohydrates at elevated temperatures less than the temperature at which corundum (alpha-alumina) commences to form. A suitable alumina is gamma-alumina calcined at 400–600° C. The particle size of the alumina may vary from that of a fluidizable powder up through granular size. The alumina may also be shaped into the form of pellets, tablets, beads, or other configurations having a maximum dimension, approximately ¼ inch. After the alumina has been calcined to a substantially anhydrous condition, it is desirable that such precautions be taken as are necessary to preclude the adsorption of water or oxygen by the alumina.

One component of the catalyst is metallic sodium, which may be the metallic sodium generally available as an article of commerce. The sodium is added to the alumina by first heating the alumina in a dry inert atmosphere to a temperature in the range of about 200–600° C., preferably in the range of about 300–500° C., and advantageously to 400° C. The sodium may be added as small pea-size pieces. The amount of metallic sodium used should be in the range of about 1 to 25 weight percent of the final catalyst, preferably 3 to 10 weight percent, and advantageously about 6 weight percent. It is desirable to add a sufficient amount of metallic sodium to provide a mono-atomic layer of sodium on the supporting gamma-type alumina, and accordingly, since suitable aluminas vary somewhat in surface area, the amount of sodium used will be correlated with the surface area of the particular alumina in question. The sodium is advantageously freshly cut and free from sodium oxide. However, the presence of sodium oxide does not impair the effectivenss of the catalyst, but should be taken into account in determining the amount of metallic sodium added to the alumina. After the metallic sodium has been added to the alumina, the mixture is mechanically stirred for a period of about 15 to 25 minutes, preferably about 20 minutes, at a temperature within the foregoing ranges. During the stirring, the metallic sodium is dispersed over the surface of the alumina.

A third component of the catalyst comprises a compound of a transition metal. As used herein, the phrase transition metal refers to those elements selected from Periods 4, 5 and 6 of the long form of Periodic Table, as set forth in Kirk-Othmer's "Encyclopedia of Chemical Technology," volume 5, page 670, having atomic numbers of 21 through 32, 39 through 51, and 57 through 84, inclusive. Of these, titanium, vanadium, chromium, manganese, iron, cobalt, nickel, copper, and zinc (all of which are in Period 4), zirconium, molybdenum, cadmium, tin, and antimony (all in Period 5), platinum, mercury, lead, and bismuth (from Period 6) are preferred. The transition metal may be added as a carbonate, sulphate, nitrate, or as an ester, such as an acetate, but because of convenience and ease in handling, the oxides are preferred. Halides of the metals may be used, but are less desirable. The transition metal added as a nitrate enhances the activity of the catalyst in that the ultimate maximum catalytic activity is achieved in less time after contacting the catalyst with feed than when the transition metal is deposited as its oxide. The amount of a transition metal used is generally in the range of about 0.1 to 10 weight percent of the completed catalyst, preferably 0.5 to 5 percent and advantageously 1 to 2 percent.

The transition metal compound is preferably incorporated into the alumina prior to the addition thereto of the metallic sodium, but is preferably added to the mixture of metallic sodium and alumina at the end of the above-described 15 to 25 minute mixing period, and while the sodium-alumina mixture is at an elevated temperature, advantageously at about 400° C. The metal compound may be added in the form of a powder and dispersed through the sodium-alumina mixture by stirring for a period of 10 to 20 minutes, advantageously about 15 minutes, while the catalyst undergoing preparation is maintained at the elevated temperature.

At the end of the mixing of the transition metal component with the metallic sodium and alumina, the catalytic mixture is preferably cooled as rapidly as possible to a moderate temperature, such as 100° F. or below. The thus formed catalyst may be used immediately or kept in storage for a period of time prior to use. However, it is desirable to exclude halogens, hydrogen, halides, water, either liquid or vapor, and oxygen from contact with the catalyst, and to that end an inert atmosphere of nitrogen or helium may be used.

The contacting of the feed with the catalyst may be done either in the liquid phase or in the vapor phase, and in either batch or continuous flow system. Because of the exceptionally high activity of the catalyst system, low temperatures are generally utilized and accordingly liquid phase operation is preferred. The pressure used may be adjusted to maintain the desired feed phase system at whatever processing temperature is being used.

The selection of the temperature of processing depends largely on the specific characteristics of the charge stock. Lower temperatures are used to achieve the same extent of double bond isomerization with smaller molecules than with larger molecules. Also, the structure of the feed and resulting product influences the required processing temperature, for example, conjugation with an aromatic ring is accomplished at lower temperatures, assuming approximately equal molecular weights, than is conjugation along a lengthy straight chain diolefin. It is a particularly advantageous feature of our process to be able to accomplish rapid shift of the double bonds at temperatures less than the temperature at which, for the compound in question, a significant amount, and in many cases, even a perceptible amount, of disproportionation, skeletal isomerization, or polymerization has occurred. Although the selected processing temperature will vary widely depending upon the characteristics of the charge stock, generally, processing temperatures will not be greater than about 100–150° C., and will be generally much lower, on the order of 0 to 40° C., and may, in many instances, be reduced to as low as about −80° C.

The duration of contacting of the feed with the catalyst should be correlated with the processing temperature, the structural characteristics of the particular feed stock in question, and the feed:catalyst ratio. Generally suitable contact times will be in the range of a few minutes, about 1 to 5 minutes, up to 2 to 3 hours. Because of the exceptionally high activity of the catalyst, feed:catalyst ratios of from 10 to 100 may be used.

After contacting the feed with the catalyst, the resulting double bond shifted products and any unreacted feed is separated from the catalyst by conventional fluid-solid separation means. Generally the yield of product will be nearly quantitative. Where a plurality of isomeric products are possible from the feed, the distribution of the various isomers will be influenced by thermodynamic equilibria.

The following laboratory data will further illustrate our new process and its applicability to a variety of feeds having a plurality of double bonds.

*Example 1*

Allyl benzene was conjugated to propenyl benzene. The catalyst comprised metallic sodium and ferric oxide supported on a gamma-type alumina. The alumina was prepared by calcining at 600° C. for 2 hours in vacuum. The pressure during calcination was about 0.1–0.5 mm. of mercury. After calcination, a 10 gram aliquot of the alumina was heated to 400° C. in a glass flask. Metallic sodium in the amount of 0.67 grams was added to the alumina and mechanically mixed therewith for 20 minutes. Thereafter, 0.13 gram of ferric oxide powder, which had been previously oven-dried at 200° C., was added to the sodium-alumina mixture, and the three component mixture was mixed for an additional 15 minutes at 400° C. Thereafter, the catalyst was cooled to room temperature.

The feed comprised 50 milliliters of allyl benzene of 99% purity obtained from a commercial supplier. Before contacting with the catalyst, the allyl benzene was percolated through silica gel. The feed had a refractive index of 1.5121.

The catalyst and the feed were precooled to 0° C., and the feed then added to the catalyst. A prompt temperature rise to about 60° C. indicated an exothermic heat of conjugation. Samples of the liquid in contact with the catalyst withdrawn at intervals of 1, 5, 30 and 60 minutes after initial contact had refractive indices between 1.5513 to 1.5515. For comparison, it is noted that Faraday's "Encyclopedia of Hydrocarbon Compounds," volume 4A, gives the refractive index of transpropenyl benzene as 1.5507. The reaction products taken 60 minutes after initial contact were analyzed and found to comprise 98.1% propenyl benzene, and 1.9% total impurities. Only a trace of allyl benzene was detected.

Example 2

In another run, cyclododecatriene-1,5,9 was used as a feed to our process. The alumina support comprised a 15.0 gram aliquot of a granular alumina which had been calcined for ½ hour at 500° C. under vacuum. The alumina aliquot was preheated for 10 minutes at 400° C., after which 0.75 gram of a commercially available ammonia synthesis catalyst was added and mixed with the alumina for 10 minutes. The ammonia synthesis catalyst was understood to comprise about 61% ferric oxide, 34% ferrous oxide, and 5% of oxides of calcium, potassium, silicon, and alumina, all on a dry basis. After the ammonia synthesis catalyst had been mixed with the alumina support, 0.96 gram of metallic sodium was added, and the mixing continued for an additional 20 minutes. The catalyst was then cooled to near room temperature.

A 25 ml. sample of the cyclododecatriene and 3–5 grams of the catalyst were precooled to 0° C. and then the feed was added to the catalyst. The contacting continued for 45 minutes at 0° C. under an inert nitrogen atmosphere. The product liquid was analyzed by ultraviolet and infra-red spectroscopic techniques. The analysis indicated that there had been an increase in conjugation of the double bonds, relative to the feed, but specific cyclododecatriene isomers were not identifiable.

Example 3

Cyclooctadiene-1,5 was conjugated. The support comprised a 15.0 gram aliquot of 28–48 mesh granules of a commercially available alumina which had been calcined for 6 hours at 500–510° C. and atmospheric pressure. Dry compressed air was passed through the calcination furnace at the rate of 2 standard cubic feet per hour. The alumina when received contained 0.058% iron, 0.0001% copper, 0.004% manganese, 0.0095% titanium, 0.24% sodium (in a combined state), and 0.056% calcium. The aliquot of alumina was heated to 400° C. in flowing nitrogen for ½ hour. Metallic sodium in the amount of 0.63 gram was then added, and mixed with the alumina for 20 minutes at 400° C. under flowing nitrogen. The catalyst was then cooled to room temperature.

The feed comprised 93 milliliters of cyclooctadiene-1,5, previously percolated through silica gel. The catalyst and the feed were separately precooled to 0° C. and then contacted. The temperature of the reaction quickly rose to 20° C. and then returned to 0° C. After 180 minutes from the initial contacting, the temperature was raised to 85° C. A sample of the reaction product taken 10 minutes after the initial contact was found upon analysis by infra-red spectra to comprise predominantly cyclooctadiene-1,3, but having about 10% cyclooctadiene-1,5. Samples of the reaction product taken 1¼ hours, 3½ hours, and 20 hours after initial contact were analyzed to comprise essentially cyclooctadiene-1,3.

Example 4

A 16 milliliter sample of diallyl (hexadiene-1,5) having a refractive index of 1.4042 was conjugated. The diallyl was prepared by reacting metallic sodium with allyl ether. The catalyst comprised 5.0 grams of 24–48 mesh alumina, and 0.21 gram of metallic sodium prepared as described in respect of the preceding run. The precooled catalyst and feed were mixed at 0° C. Samples of the reaction product withdrawn ¼ hour and 2 hours after the initial contact had refractive indices of 1.4521 and 1.4524, respectively. For comparison, Rossini gives the refractive index of hexadiene-2,4 as 1.450. Upon analysis by infra-red spectra, the two samples referred to above were found to be identical, to be free of diallyl, and to comprise a compound or compounds having a $CH_3$-group.

Example 5

Dipentene (limonene-d) was conjugated at 25° C. and 0° C. At each temperature, the catalysts' preparation was the same as set forth in respect of the preceding run.

A 100 milliliter sample of dipentene, which after percolation through silica gel had a refractive index of 1.4730, was added to the catalyst at 25° C. The initial exothermic reaction raised the temperature to 48° C. for a short period of time. During the first 100 minutes of the run, the reaction mixture foamed copiously.

A sample of the reaction mixture withdrawn after 1 hour contact time had a refractive index of 1.4899, and, based on that refractive index, was estimated to comprise 75–80% para-cymene. A second sample taken two hours after the initial contact had a refractive index of 1.4910 and was estimated to comprise 100% para-cymene, the refractive index of which is 1.4909.

The run was repeated, again using a catalyst comprising 15.0 grams of alumina support and 0.63 gram of metallic sodium. A feed comprising 125 milliliters of limonene-d having a refractive index of 1.4642 was contacted with the catalyst at 0° C. The initial temperature rise was 10° C. Cuts taken at various intervals subsequent to the initial contact had refractive indices and estimated compositions as follows:

| Reaction Time, minutes | 2 | 5 | 10 | 60 | 90 | 120 | 240 | 540 |
| --- | --- | --- | --- | --- | --- | --- | --- | --- |
| Refractive Index, $M_D$ | 1.4734 | 1.4740 | 1.4748 | 1.4789 | 1.4800 | 1.4811 | 1.4848 | 1.4882 |
| Product Composition, Percent: | | | | | | | | |
| Alpha-terpinene | 13 | 22 | 22 | 25 | 24 | 24 | 20 | 10 |
| Alpha-phellandrene | | 7 | 7 | 7 | 7 | 7 | 6 | 3 |
| Gamma-terpinene | | 4 | 4 | 3 | 3 | 2 | 2 | 1 |
| Total cyclohexadienes | 13 | 33 | 33 | 35 | 34 | 33 | 28 | 14 |
| Terpinolene | 28 | 40 | 45 | 34 | 34 | 31 | 24 | 11 |
| Para-cymene | 59 | 27 | 22 | 31 | 32 | 36 | 48 | 75 |

Example 6

Pentene-1 is converted to pentene-2 in the following manner. Pentene-1 having a refractive index $n_D^{20}$ of 1.3710 (literature: 1.3710) was treated and stored with sodium ribbon under a nitrogen blanket. A 100 milliliter sample of said treated pentene-1 and 16 g. of the catalyst described in Example 1 were precooled to −79° C. with a Dry Ice-acetone bath. The precooled catalyst and pentene-1 were mixed at −79° C. and held at this temperature for about 6 minutes. Thereafter the catalyst was removed from the product and the product analyzed by gas chromatography. It was found that the product contained over 98 percent pentene-2 and was mainly cis-pentene-2 isomer.

Example 7

1-phenylbutene-2 is percolated through silica gel (desiccant-grade) and stored under a nitrogen blanket. A 100 milliliter sample of this 1-phenylbutene-2 and a 10.8 g. sample of the catalyst described in Example 1 are separately precooled to 0° C. and then combined and maintained at 0° C. for about 30 minutes. Thereafter the catalyst was separated from the isomerization product and the isomerization product analyzed. It was found that the isomerization product contained over 90 percent 1-phenylbutene-1.

*Example 8*

Diallyl ether is percolated through desiccant-grade silica gel and stored under a nitrogen blanket. A 50 milliliter sample of said diallyl ether and a 10.8 g. sample of the catalyst described in Example 1 are separately precooled to —79° C. Thereafter the ether and catalyst are combined and maintained at —79° C. for about two hours. After separating the catalyst from the ether product it was found upon analysis that the ether product contained dipropen-2-yl ether. By this process the conversion of diallyl ether to its dipropen-2-yl ether isomer was about 30 percent.

*Example 9*

Safrole was percolated through desiccant-grade silica gel and stored under a nitrogen blanket. A 50 milliliter sample of said treated safrole and a 10.8 g. sample of the catalyst described in Example 1 are separately cooled to 20° C. and thereafter combined. The mixture of safrole and catalyst are maintained at 20° C. for about two hours and then the catalyst was separated from the isomerization product. From analysis of the isomerization product, it was found that 95 percent of the safrole had been converted to isosafrole.

*Example 10*

A 50 milliliter sample of 3-butenenitrile, taken from 3-butenenitrile which had previously been percolated from desiccant-grade silica gel and stored under nitrogen, was cooled to —79° C. A 10.8 g. sample of catalyst described in Example 1 was also cooled to —79° C. The precooled nitrile and catalyst were contacted for about 30 minutes at —79° C. after which the catalyst was separated from the nitrile isomerization product. From analysis of the isomerization product, it was found to contain over 95 percent 2-butenenitrile.

By contacting 3-butenenitrile with the catalyst in the same manner as described in Example 10 and in the same proportions but at 25° C. for about 90 minutes, it was found that the resulting product was a polymer containing up to 6 units of the monomer.

From the foregoing illustrative examples and detailed description of the process of this invention with respect to the wide application of the process of this invention to hydrocarbons containing a plurality of carbon-to-carbon double bonds, mono-olefins containing terminal unsaturation, unsaturated ethers, unsaturated nitriles, unsaturated tertiary amines and acetals of unsaturated aldehydes, it will be readily appreciated that numerous other unsaturated compounds of the foregoing types can be similarly isomerized with respect to shifting of carbon chain double bonds to provide useful isomers. As hereinbefore indicated, the process of this invention can be employed to obtain double bond shifted isomers of compounds which would not be otherwise available or whose precursors would be altered in chemical nature by treatment with other isomerization catalysts.

We claim:
1. A process for converting pentene-1 to pentene-2 which comprises contacting pentene-1 in an inert atmosphere with a catalyst comprising in the range of about 1 to 25 weight percent of total catalyst of metallic sodium and in the range of about 0.1 to 10 weight percent of total catalyst of a compound of a transition metal supported on gamma-type alumina, and thereafter separating catalyst from pentene-2.

2. A process for converting diallyl ether to dipropen-2-yl ether which comprises contacting diallyl ether in an inert atmosphere with a catalyst comprising in the range of about 1 to 25 weight percent of total catalyst of metallic sodium and in the range of about 0.1 to 10 weight percent of total catalyst of a compound of a transition metal supported on gamma-type alumina, and thereafter separating catalyst from dipropen-2-yl ether.

3. A process for converting safrole to isosafrole which comprises contacting safrole in an inert atmosphere with a catalyst comprising in the range of about 1 to 25 weight percent of total catalyst of metallic sodium and in the range of about 0.1 to 10 weight percent of total catalyst of a compound of a transition metal supported on gamma-type alumina, and thereafter separating catalyst from isosafrole.

4. A process for converting 3-butenenitrile to 2-butenenitrile which comprises contacting 3-butenenitrile in an inert atmosphere with a catalyst comprising in the range of about 1 to 25 weight percent of total catalyst of metallic sodium and in the range of about 0.1 to 10 weight percent of total catalyst of a compound of a transition metal supported on gamma-type alumina, and thereafter separating catalyst from 2-butenenitrile.

5. A process for shifting carbon-to-carbon double bonds in limonene which comprises contacting limonene in an inert atmosphere with a catalyst comprising in the range of about 1 to 25 weight percent of total catalyst of metallic sodium and in the range of 0.1 to 10 weight percent of total catalyst of a compound of a transition metal supported on gamma-type alumina, and thereafter separating catalyst from the double bond isomerized product.

References Cited by the Examiner

UNITED STATES PATENTS 2,952,719 9/1960 Appell _____ 260—683.2
2,994,727 8/1961 Appell et al. _____ 260—683.2

HENRY R. JILES, *Acting Primary Examiner.*

DUVAL T. McCUTCHEN, WALTER A. MODANCE,
*Examiners.*